United States Patent Office 2,731,493
Patented Jan. 17, 1956

2,731,493
CHOLINE ESTERS

John Alfred Aeschlimann, Montclair, and Arthur Stempel, River Edge, N. J., assignors to Hoffmann-La Roche Inc., Nutley, N. J., a corporation of New Jersey No Drawing. Application January 25, 1954, Serial No. 406,056

5 Claims. (Cl. 260—490)

This invention relates to non-hygroscopic salts of choline esters. More particularly, this invention relates to non-hygroscopic arylsulfonic acid salts of lower acyl esters of choline.

The novel salts of this invention have the same utility as the known salts of choline esters. See, for example, U. S. Patents Nos. 1,957,443 and 1,957,461, both issued May 8, 1934.

Lower acyl esters of choline are conventionally used in the form of salts such as the halogen salts, e. g. acetyl choline chloride. These salts, however, are very hygroscopic, giving rise to difficulties in isolating the product and also in handling and storing. Some of the known salts of acyl cholines are difficult to crystallize and, in the case of the iodides, tend to discolor on standing due to oxidation. The lower acyl choline arylsulfonates of this invention do not present such difficulties but are non-hygroscopic and stable. These new salts crystallize readily from solution and do not deteriorate upon standing.

The compounds of our invention are salts of lower fatty acid esters of choline and arylsulfonic acids which may be represented by the following structural formula:

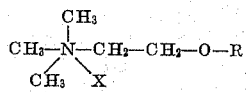

wherein R represents a lower aliphatic acyl radical and X represents an anion of an arylsulfonic acid. Representative lower aliphatic acyl radicals include lower fatty acid radicals such as acetyl, propionyl and butyryl. Arylsulfonic acids which form non-hygroscopic salts with lower aliphatic acyl choline esters are benzenesulfonic acid and toluenesulfonic acid.

The compounds of our invention may be prepared in the following manner. β-dimethylamino ethanol is esterified with a lower fatty acid anhydride, e. g. acetic anhydride, to obtain the corresponding tertiary ester. The tertiary ester obtained in this manner is quaternized with a lower alkyl arylsulfonate quaternizing agent, e. g. methyl-p-toluenesulfonate, to obtain the desired, non-hygroscopic acyl choline arylsulfonate.

The method of producing the non-hygroscopic salts of choline esters of our invention is further illustrated by the following examples:

Example 1

A mixture of 45 grams of dimethylamino ethanol and 102 grams of acetic anhydride were heated for 3 hours in a steam bath. Crude β-dimethylaminoethyl acetate was separated from dark-colored decomposition products by distillation, collecting the fraction boiling between 135 and 161.5° C. 135 grams of the crude product thus obtained were dissolved in 750 cc. of benzene and 93 grams of methyl-p-toluenesulfonate were added. After standing overnight at room temperature, ether was added and the product precipitated. The oil that first separated crystallized upon stirring. Recrystallization from acetone gave pure non-hygroscopic acetylcholine-p-toluenesulfonate, M. P. 109–110° C. (uncorr.).

Example 2

To 90 grams of dimethylamino ethanol, 260 grams of propionic anhydride were slowly added. The mixture was then heated on a steam bath for 3 hours. A dark reaction mixture was produced. Crude β-dimethylaminoethyl propionate was separated by distillation, collecting the fraction boiling at 163–172° C. 175 cc. of crude β-dimethylaminoethyl propionate prepared in this manner were dissolved in 1 liter of benzene. To the solution were added 172 grams of methyl-p-toluenesulfonate. The solution was kept overnight at room temperature and the crystals that formed were filtered and dried. A second crop of crystals was obtained by addition of ether to the mother liquor. Both crops of crystals were combined and recrystallized from ethanol. The non-hygroscopic propionylcholine-p-toluenesulfonate melted at 121–123° C. (uncorr.).

Example 3

β-dimethylaminoethyl butyrate was prepared by reacting 90 grams of dimethylamino ethanol with 320 grams of butyric anhydride according to the procedure described in Example 2. The fraction of the reaction products distilling between 180 and 191° C. contained the crude ester. To 10 cc. of the crude β-dimethylaminoethyl butyrate in 50 cc. of benzene were added 8 grams of methyl-p-toluenesulfonate. After 24 hours at room temperature, the white crystals which had formed were filtered and washed with benzene. The butyrylcholine-p-toluenesulfonate was recrystallized from acetone and melted at 118–120° C. (uncorr.). The salt was non-hygroscopic.

Example 4

A solution of 5 cc. of crude β-dimethylaminoethyl acetate, prepared as in Example 1, in 25 cc. of benzene, and an excess (10 cc.) of methylbenzene-sulfonate was refluxed for 1 hour. After cooling, ether was added. The crystals which precipitated were recrystallized from a mixture of acetone and ether. The pure, non-hygroscopic acetylcholine-benzenesulfonate melted at 99–101° C. (uncorr.).

Example 5

5 cc. of crude β-dimethylaminoethyl propionate, produced as in Example 2, were reacted with methylbenzenesulfonate according to the procedure described in the preceding example. The non-hygroscopic product, propionylcholine-benzenesulfonate, recrystallized from a mixture of acetone and ether, had a M. P. of 87–89° C. (uncorr.).

Example 6

Non - hygroscopic butyrylcholine - benzenesulfonate, M. P. 77–78° C. (uncorr.), was prepared from 5 cc. of crude β-dimethylaminoethyl butyrate (produced as in Example 3) and methylbenzenesulfonate according to the procedure described in Example 4.

We claim:

1. A compound of the group consisting of benzenesulfonic acid salts of lower aliphatic acid esters of choline and toluene-sulfonic acid salts of lower aliphatic acid esters of choline.
2. Acetylcholine-p-toluenesulfonate.
3. Acetylcholine-benzenesulfonate.
4. Propionylcholine-p-toluenesulfonate.
5. Butyrylcholine-p-toluenesulfonate.

(References on following page)

References Cited in the file of this patent

UNITED STATES PATENTS

| | | |
|---|---|---|
| 1,957,461 | Jones et al. | May 8, 1934 |
| 2,013,536 | Cline | Sept. 3, 1935 |
| 2,380,877 | Shelton | July 31, 1945 |

FOREIGN PATENTS

| | | |
|---|---|---|
| 259,253 | Switzerland | June 16, 1949 |

OTHER REFERENCES

Sackur: Bull. Soc. Chim. (France) 1952, 796–7 (2 pages).